United States Patent
Beckman

(10) Patent No.: US 6,319,350 B1
(45) Date of Patent: Nov. 20, 2001

(54) METHOD OF MANUFACTURE FOR FLEXIBLE HOSE

(76) Inventor: Hunter Beckman, P.O. Box 11740 Mission Station, Tucson, AZ (US) 85734

( * ) Notice: Subject to any disclaimer, the term of this patent is extended or adjusted under 35 U.S.C. 154(b) by 0 days.

(21) Appl. No.: 09/204,628

(22) Filed: Dec. 2, 1998

(51) Int. Cl.[7] .................. F16L 11/11; F16L 11/12
(52) U.S. Cl. .............. 156/219; 138/122; 156/143; 156/149; 156/206; 156/209
(58) Field of Search ............... 156/143, 144, 156/209, 219, 220, 206, 86, 149, 172; 264/313, 316, 284, 293, 230, 342 R; 138/122; 428/36.8

(56) References Cited

U.S. PATENT DOCUMENTS 3,155,757 * 11/1964 Kramer et al. .................. 156/143 X
5,145,628 * 9/1992 Karg et al. ..................... 156/149 X

FOREIGN PATENT DOCUMENTS

740732 * 11/1955 (GB) .................... 138/122

* cited by examiner

Primary Examiner—Adrienne C. Johnstone
(74) Attorney, Agent, or Firm—Mark E. Ogram P.C.

(57) ABSTRACT

A method of producing a hose in which a relatively inelastic material, such as ultra-high molecular weight polyethylene, is wrapped around an uncured hose. A rope is then wrapped about this combination with a cure wrap encircling the entire hose. During the curing process, the rope becomes embedded in the inelastic material forcing the underlying hose to be displaced. Once fully cured, the cure wrap and the rope are removed. The valleys where the rope was embedded into the hose provides flexibility which allows a hose with a highly protective outer coating to be flexible enough to reduce susceptibility to kinking during use, has a low coefficient of friction during dragging, is highly resistant to abrasion, and provides significantly improved chemical resistance compared to conventional hose constructions.

11 Claims, 3 Drawing Sheets

METHOD OF MANUFACTURE FOR FLEXIBLE HOSE

BACKGROUND OF THE INVENTION

This invention relates generally to the manufacture of hoses and more particularly to the manufacture of hoses in need of enhanced flexibility along with abrasion and chemical resistance.

The hose goes back to antiquity. It is fundamental to the operation of almost all machines and forms the linchpin upon which many technological advances depend. Improvement in basic hoses have allowed advancements in: aerial refueling; breathing in outer-space; solar heating collectors; ship-to-ship refueling; chemically and biologically resistant delivery systems; and deep sea diving.

In many applications, there is a significant need for a hose which has a highly durable outer coating to resist damage, wear and chemical degradation during handling. Unfortunately, the vast majority of durable materials which can be used in this context are stiff which promotes kinking and early failure. When a hose is made of this type of material, often the hose becomes so rigid it resembles a pipe more than a hose.

While stiffness may be acceptable in small lengths and in certain applications, the need to coil the hose for storage, bend for attachment ease, or flex during usage without inflicting permanent damage, becomes more problematic.

In one common method to improve the flexibility of such a hose, current technology uses a cure wrap placed over the uncured hose and a rope is tightly wound around the cure wrap. During the curing process, the rope's natural tautness and shrinkage, causes corrugations in the outside of the hose. While this does serve to improve the flexibility of the hose, it falls short of achieving all of the benefits sought.

It is clear that there is a need for a production process which will enhance hose flexibility, improve abrasion resistance, and prevent other surface and chemical damage, while employing a wider range of desirable surface materials.

SUMMARY OF THE INVENTION

The present invention creates a method of producing a hose in which a relatively inelastic material, such as ultra-high molecular weight polyethylene, is wrapped around an uncured hose.

Those of ordinary skill in the art readily recognize a variety of compounds and structures which can be used to make the uncured hose. The preferred layering is:

an inner layer of ultra-high molecular weight polyethylene;

Layers of twine and wire, when necessary; and,

Layers of Ethylene Propylene Diene Monomer ("EPDM") rubber.

Over this uncured hose, a layer of relatively inelastic material is placed. The ideal material in this context is a layer of ultra-high molecular weight polyethylene (UHMwPE). It has been found that UHMwPE is ideal in this situation since it withstands a great deal of abuse without cracking or degrading, while resisting a wide range of chemicals. Those of ordinary skill in the art recognize other materials which will serve in this function.

A rope is then wrapped about this combination with a cure wrap encircling the entire assembly. Note, in the preferred embodiment, the rope is placed in direct contact with the UHMwPE.

The hose is then vulcanized (cured). The cure temperature and the dwell time is dictated by the materials used, and is well known to those of ordinary skill in the art.

During the curing process, the cure wrap presses the high shrinkage rope against the inelastic material forcing the underlying EPDM rubber to be displaced. Corrugations are formed in the inelastic material without any significant decrease of the thickness of the inelastic material.

Once fully cured, the wrap and the rope are removed leaving a hose which has been covered by inelastic material (i.e. URMwPE) with significant valleys formed therein. These valleys allow the resulting hose to have significantly improved flexibility. Although, the valleys extend deeper than the thickness of the outer UHMwPE layer, it is the underlying EPDM rubber which has been displaced and not the URMwPE material. The thickness of the URMwPE remains essentially uniform throughout the formed hose.

The valleys where the rope was embedded into the hose provide for an "elastic" affect allowing the resulting hose to have a highly protective outer coating with significantly improved flexibility compared to a hose made with an inelastic cover material such as UHMwPE without corrugations.

The invention, together with various embodiments thereof, will be more fully explained by the accompanying drawings and the following description.

DRAWINGS IN BRIEF

DRAWINGS IN DETAIL

FIGS. 1A–1G illustrate the steps taken in the manufacture of the preferred embodiment.

Figure 1A:
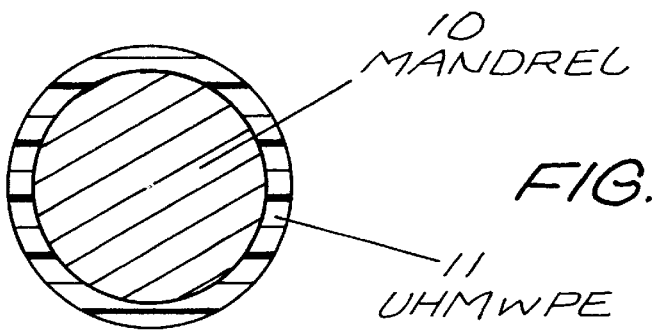
FIGS. 1A–1G illustrate the steps taken in the manufacture of the preferred embodiment.
Figure 1B:
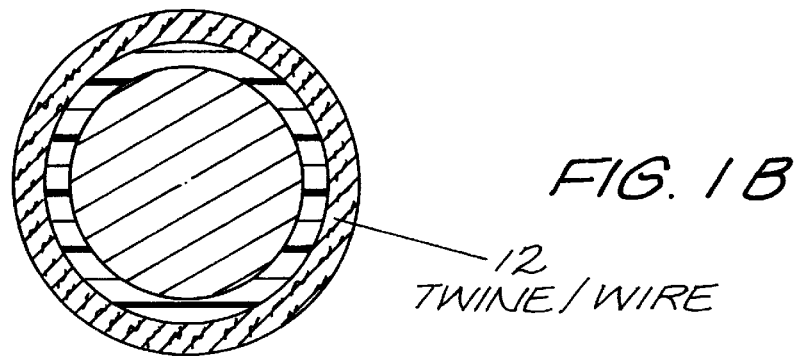

Referring to FIG. 1A, over mandrel 10, a layer of UHMwPE 11 is placed. This layer will eventually become the interior lining for the hose. In the next few steps, rubber twine and wire when applicable, 12 are laid (FIG. 1B). This assembly forms the basic uncured hose.

Figure 1C:
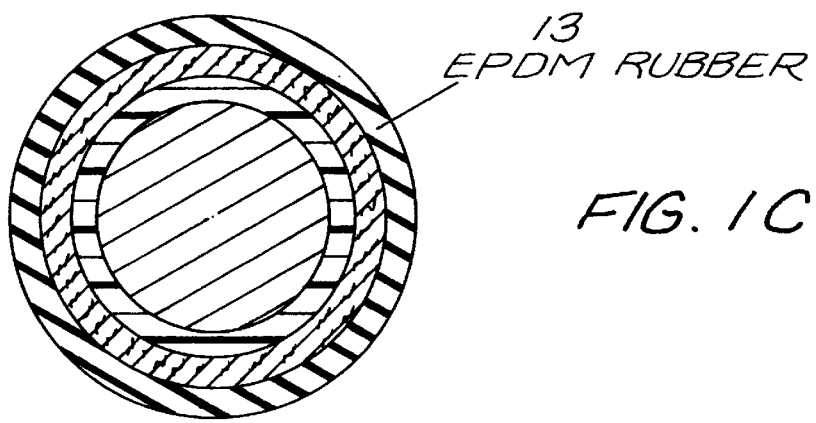
Figure 1D:
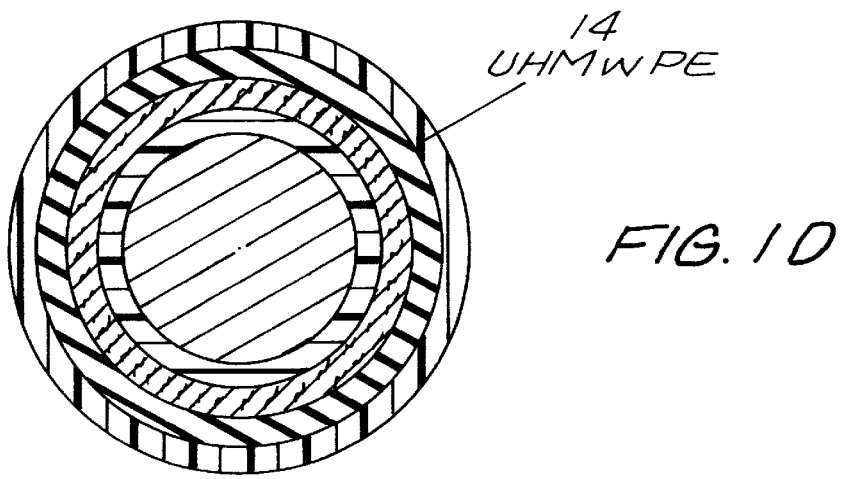

Over the uncured hose (as shown in FIG. 1C), a layer of UHMwPE 14 is laid (FIG. 1D). This layer will eventually form the outer coating of the hose. As noted earlier, while UHMwPE is used as the preferred material, those of ordinary skill in the art readily recognize other materials which can be used as a substantially inelastic coating.

Figure 1E:
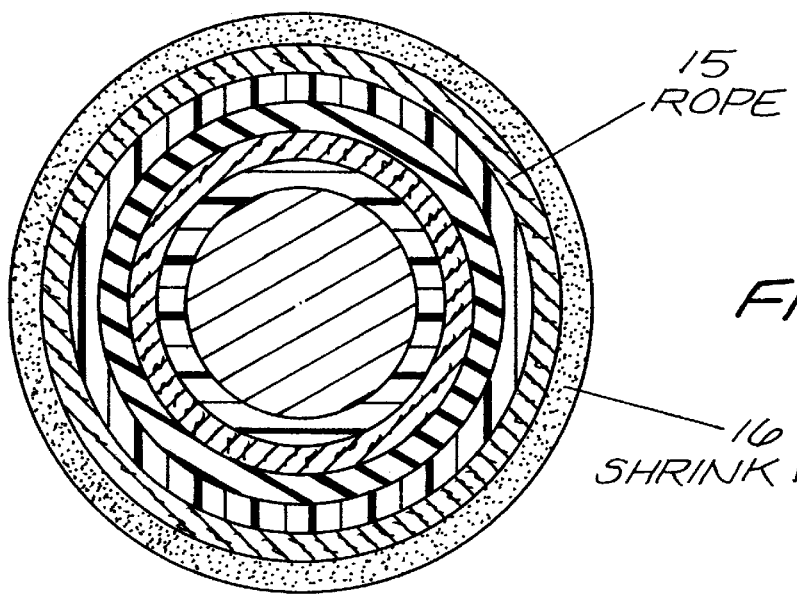

Over the assembly of FIG. 1D, rope 15 is wound and cure wrap 16 is applied (FIG. 1E). This completes the uncured assembly, which is now ready for curing.

Figure 1F:
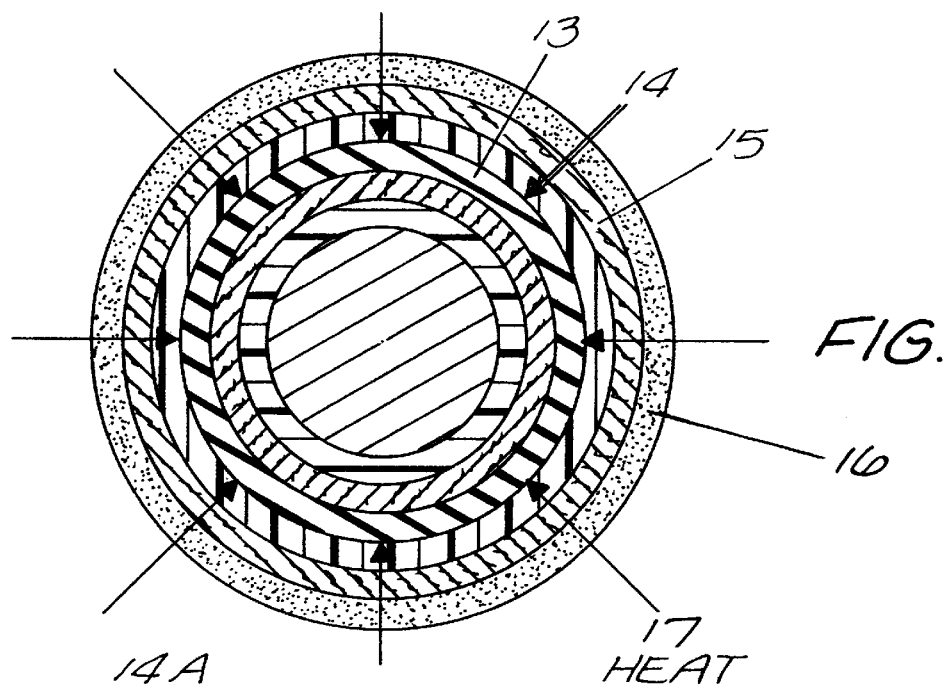

During the curing stage, FIG. 1F, heat 17 is applied causing the cure wrap 16A to contract and force rope 15 against the underlying UHMwPE 14 layer. While heat 17 is able to readily cure the EPDM rubber 13, the UHMwPE 14 is relatively unaffected and is merely "pushed" into the underlying soft EPDM rubber 13 layer.

Figure 1G:
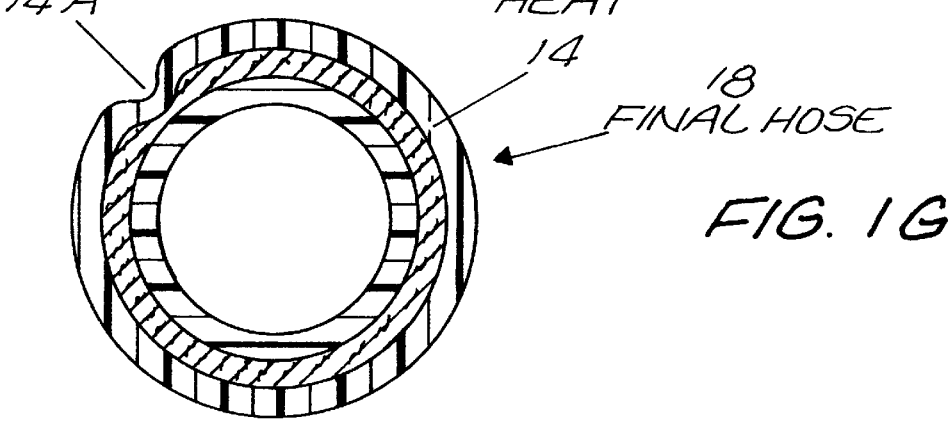

After the curing stage, FIG. 1F, the wrap 16 and rope 15 are peeled away and the mandrel 10 is removed leaving the finished hose 18 (FIG. 1G). Note the indentation 14A in the UHMwPE 14 layer which was formed by the pressing of the rope against the UHMwPE 14 during curing. Ideally, indentation 14A is considerably deeper than the thickness of UHMwPE 14; note though that the layer of UHMwPE 14 is substantially uniform, even in the area of indentation 14A.

Figure 2:
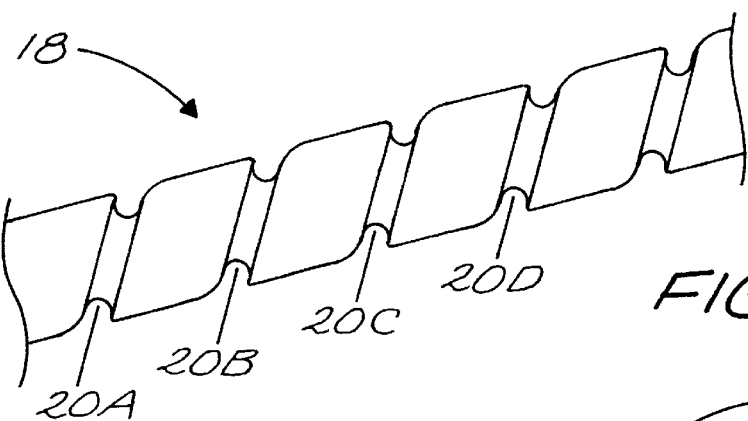
FIG. 2 is a perspective view of the final hose of this embodiment.

FIG. 2 is a perspective view of the final hose of this embodiment.

Hose 18 has an indented winding 20 extending its entire length. Indented winding 20 provides hose 18 with the sought after flexibility.

Figure 3:
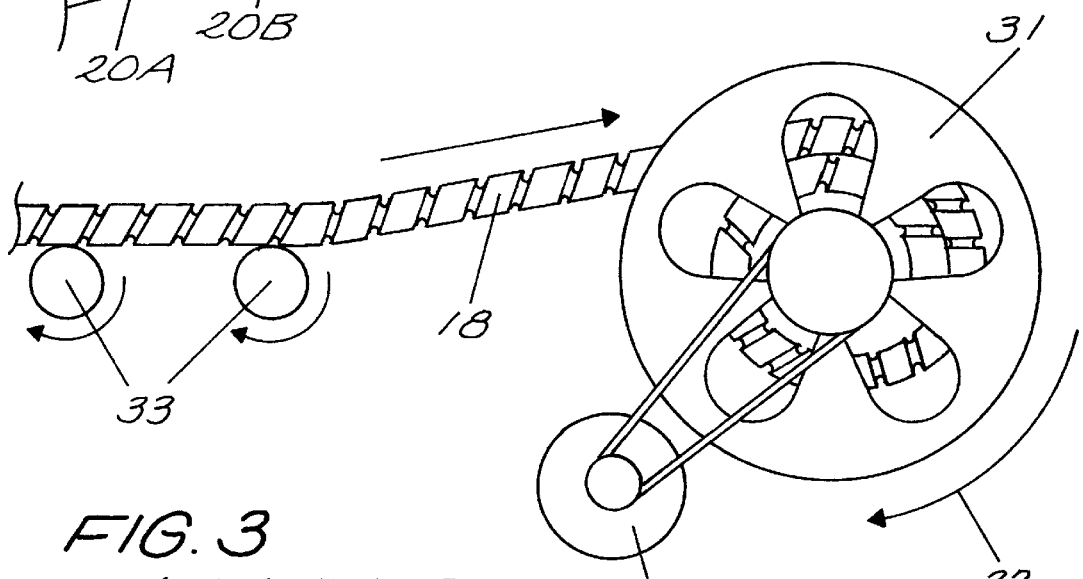
FIG. 3 is a side view showing the hose being coiled tightly for shipment.

FIG. 3 is a side view showing the hose being coiled onto a reel.

Hose 18 is pulled from rollers 33 by reel 31 which is driven in the direction of arrow 32 by motor 30. Since hose 18 has the indentations noted earlier, it is flexible enough to be placed on reel 31 for shipping or storage.

Figure 4:
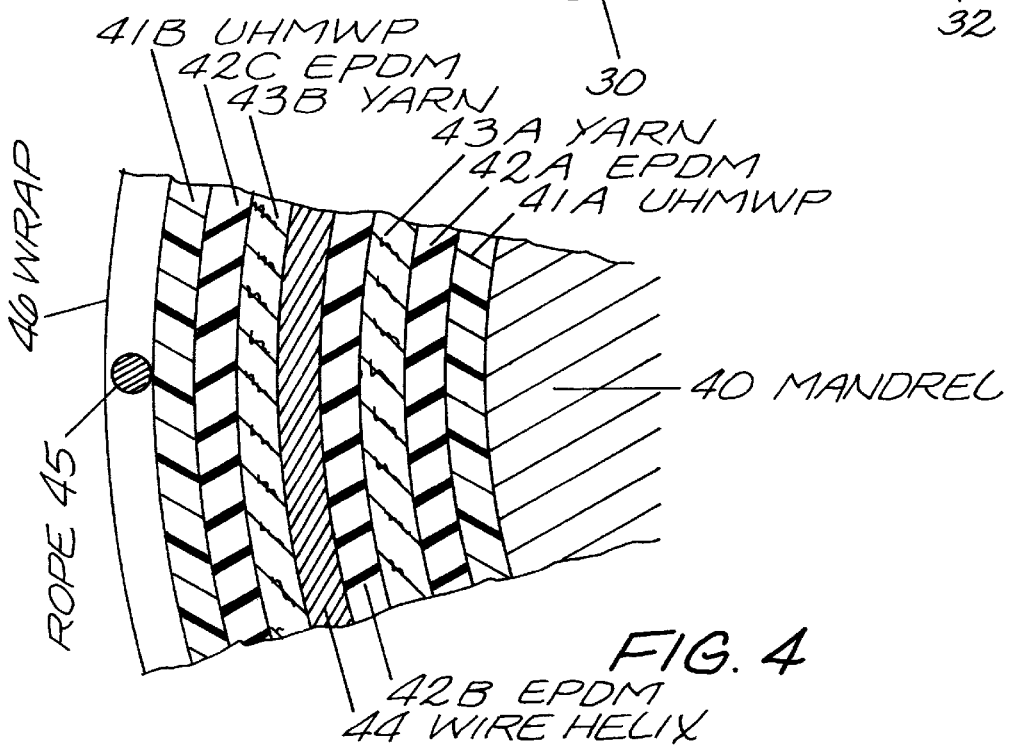
FIG. 4 is a cross sectional view of an alternative embodiment of the uncured hose.

FIG. 4 is a cross sectional view of an alternative embodiment of the uncured hose. The interior wrap of UHMwPE 41A is placed in a layering process, over mandrel 40 is followed by a first layer of EPDM 42A and then yarn 43A. Successively thereafter, layers of: EPDM 42B, wire helix 44, yarn 43B, EPDM 42C, and finally an outer layer of UHMwPE 41B.

Around this assembly is wrapped rope 45. The entire assembly is then encased by wrap 46. This entire assembly is ready for curing.

The invention as described above, creates a production process which enhances hose flexibility while employing a wider range of desirable surface materials such as ultra-high molecular weight polyethylene.

What is claimed is:

1. A method of manufacturing a hose comprising the steps of:
   a) over an uncured hose body, placing a layer of inelastic material to form an uncured hose;
   b) wrapping a rope around said inelastic material;
   c) while curing said hose, pressing said rope against said inelastic material to a depth greater than a thickness of said inelastic material: and
   d) removing said rope from said cured hose.

2. The method of manufacture according to claim 1, further including the step of, forming said uncured hose over a non-deformable mandrel.

3. The method of manufacture according to claim 2, further including the steps of wrapping a layer of cure wrap around said rope and said uncured hose prior to the step of pressing said rope and removing said layer of cure wrap after the step of curing said hose.

4. The method of manufacture according to claim 3, further including the step of winding said hose onto a reel after the step of removing said layer of cure wrap.

5. The method of manufacture according to claim 4, further including the step of forming said inelastic material from ultra-high molecular weight polyethylene.

6. A method of manufacturing a hose comprising the steps of:
   a) creating an uncured hose body over a mandrel;
   b) placing a layer of inelastic material over said uncured hose body to form an uncured hose;
   c) wrapping a rope around said inelastic material;
   d) placing a layer of cure wrap over said rope and said inelastic material;
   e) curing said hose, said layer of cure wrap shrinking thereby pressing said rope against said inelastic material to a depth greater than a thickness of said inelastic material:
   f) removing said layer of cure wrap after the step of curing said hose; and
   g) removing said rope from said cured hose.

7. The method of manufacture according to claim 6, further including the step of winding said hose onto a reel after the step of removing said rope.

8. The method of manufacture according to claim 7, further including the step of forming said inelastic material from ultra-high molecular weight polyethylene prior to the step of creating an uncured hose body.

9. A method of manufacturing a pliable hose comprising the steps of:
   a) creating an uncured hose assembly on a mandrel, said uncured hose assembly having an uncured hose body and a layer of inelastic material forming an uncured hose, a rope wound there around, and a cure wrap;
   b) curing said hose, said layer of cure wrap shrinking thereby pressing said rope against said inelastic material to a depth greater than a thickness of said inelastic material: and,
   c) removing said cure wrap and said rope from said cured hose.

10. The method of manufacture according to claim 9, further including the steps of:
    a) removing said mandrel; and,
    b) winding said hose onto a reel.

11. The method of manufacture according to claim 9, further including the step of, prior to the step of creating an uncured hose assembly, the step of forming said inelastic material from ultra-high molecular weight polyethylene.

* * * * *